[19] Wikman

[11] 3,957,421
[45] May 18, 1976

[54] HEAT INJECTOR GAS BURNER
[75] Inventor: Ernest H. Wikman, Woburn, Mass.
[73] Assignee: Raytheon Company, Lexington, Mass.
[22] Filed: Sept. 3, 1974
[21] Appl. No.: 502,324

[52] U.S. Cl. .............................. 431/353; 431/354
[51] Int. Cl.² ....................................... F23D 15/02
[58] Field of Search ........... 431/353, 181, 350, 354; 432/222

[56] References Cited
UNITED STATES PATENTS
3,915,625   10/1975   Hapgood........................... 431/353

Primary Examiner—William F. O'Dea
Assistant Examiner—Harold Joyce
Attorney, Agent, or Firm—Harold A. Murphy; Joseph D. Pannone; John T. Meaney

[57] ABSTRACT

A heat injector gas burner having controlled air flow for assuring positive repetitive ignitions, comprising an elongated tubular casing having therein a short tubular flame holder into which gas is introduced, means at one end of the casing for metering the flow of air into the casing and simultaneously into the adjacent end of the flame holder, and ignition means within the casing external to and adjacent the opposite end of the flame holder, which metering means produces controlled velocity of air flow within the casing both inside and outside the flame holder, the air flow through the flame holder being metered whereby a sufficiently rich gas-air mixture is provided to insure first ignition, and a sufficiently lean mixture is provided assuring positive repetitive subsequent ignitions.

2 Claims, 3 Drawing Figures

HEAT INJECTOR GAS BURNER

BACKGROUND OF THE INVENTION

In the manufacture of gas-fueled devices such as incinerators, for example, it is often highly desirable that the burner thereof be located in a chamber remote from the chamber in which combustion takes place. This thus requires that the burner be designed so as to efficiently produce an exceptionally long flame which will extend into the remote combustion area.

Burner structures have been made which employ an outer tubular casing which encloses a parallel short tubular flame holder, with air being introduced simultaneously into adjacent ends of the casing and flame holder. Gas is introduced into the flame holder for mixing with the air therein for primary combustion when ignited adjacent the exit end of the flame holder. Secondary combustion is sustained by the air flowing between the flame holder and casing.

In many such apparatus, space restrictions are such as to require that incoming air flow be redirected along a path which is substantially perpendicular to its initial direction.

Copending U.S. patent application Ser. No. 466,096, now U.S. Pat. No. 3,915,625 filed May 2, 1974 is an example of such a known burner structure.

However, in known burners of this character it has been found difficult to regulate or adjust the quantity and velocity of primary air within the flame holder for most efficient ignition. More particularly it has been found difficult to insure repetitive ignitions such as are required for certification by the American Gas Association. In a device such as disclosed in the aforementioned copending application Ser. No. 466,096 now U.S. Pat. No. 3,915,625, the production of uniform velocity air flow on both sides of the flame holder within the casing has been sufficient for certain selected uses. However, in some cases it has been found that while initial ignition is readily achieved, repetitive and relatively closely spaced subsequent ignitions will not always satisfactorily occur.

SUMMARY OF THE INVENTION

In accordance with the present invention the foregoing and other problems are improved upon or overcome by the provision of a burner structure employing a short tubular flame holder within an elongated tubular casing wherein air is directed into the casing from a direction perpendicular to the axis of the casing and wherein said air flow into the adjacent entrance end of the flame holder is controlled or metered by a focusing director which achieves controlled flow of air within both the casing and flame holder to provide efficient quantities of primary air for efficient initial ignition and for subsequent repetitive ignitions. Gas is introduced into the flame holder for mixing with the air flowing therethrough and such controlled air flow is necessary for proper ignition of gas-air mixtures emanating from the exit end of the flame holder.

The focusing director comprises a cupped member which is mounted within the end portion of the casing in spaced relation with the adjacent end of the flame holder. Air is metered through a duct into the casing perpendicular to the axis of the casing and into the focusing director which is located opposite the adjacent end of the flame holder so that a substantial portion of the incoming air is redirected into the flame holder, while the remaining air flows axially within the casing around the flame holder for secondary combustion.

Such air through the flame holder provides a so-called "lean" gas-air mixture which ensures repetitive subsequent ignitions following an initial ignition, thus making the burner and ignition system fail-safe.

BRIEF DESCRIPTION OF THE DRAWINGS

The above and other objectives of this invention will become apparent from the following description taken in connection with the accompanying drawings, wherein.

DESCRIPTION OF THE PREFERRED EMBODIMENT

Figure 1:
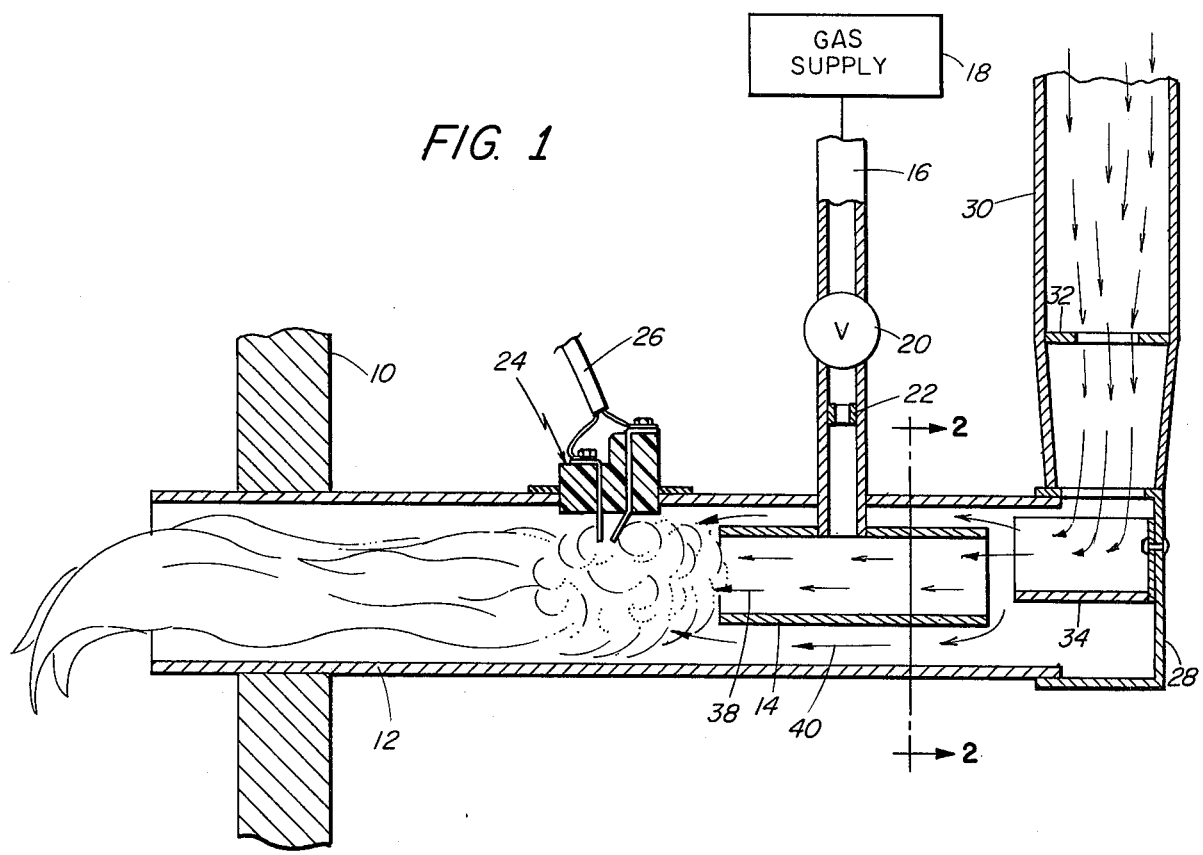
FIG. 1 is a vertical sectional view of a burner structure embodying the invention.

Referring more particularly to the drawings wherein like characters of reference designate like parts throughout the views, the burner 10 shown in FIG. 1 is adapted to be mounted, for example, in a chamber which is located on one side of a wall or partition 10 to produce a flame which extends into the chamber on the opposite side of the partition.

Figure 2:
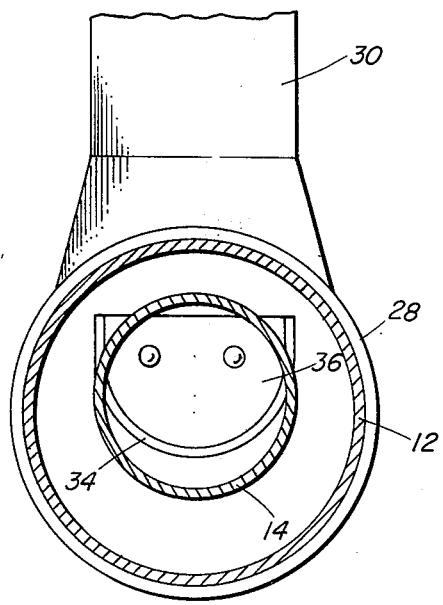
FIG. 2 is a sectional view taken on line 2—2 of FIG. 1 looking in the direction of the arrows.

The burner comprises a casing 12 which has one end protruding through an opening in the partition. Casing 10 is tubular in shape and has within it spaced substantially inwardly from the opposite end thereof, a flame holder 14 which is in the form of a short tubular member of substantially smaller diameter than casing 12. Flame holder 14 extends parallel with the axis of casing 12 and is located somewhat closer to the top than to the bottom of the casing as shown clearly in FIGS. 1 and 2.

A gas supply pipe 16 is connected at one end to a manifold or other source of gas 18, with its other end projecting through an opening in casing 12 and connected directly into the flame holder 14 whereby gaseous fuel may flow from the supply 18 into the flame holder 14. The pipe 16 may contain a conventional valve or regulator 20 and an orifice 22 if desired for controlling the flow of the fuel.

An ignitor 24 of any selected type, such as the Fenwal spark ignitor shown, is mounted in the casing adjacent the inner end of the flame holder, and is adapted to be connected to a suitable source of electrical energy in any conventional manner through cable 26.

The inner end of the casing 12 is enclosed within an end-mounted box 28 to a side wall of which is connected one end connected one end of a duct 30 which is connected at its other end to a plenum or other source (not shown) of forced air flow. Air passes through the duct in quantity and velocity controlled by a suitable orifice 32 therewithin and flows into the box 28 and thence into the adjacent end of the casing 12.

Figure 3:
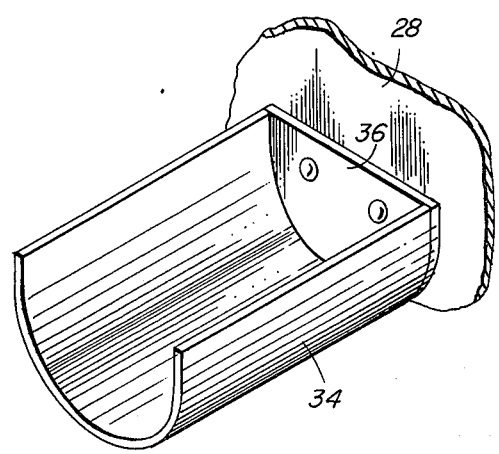
FIG. 3 is an isometric view of the focusing director.

Within the box 28 is a focusing director 34 in the form of a half cylinder positioned with its open side directed upwardly toward the duct 30 so as to receive the brunt of the air flow passing from the duct 30 into the casing 12. The focusing director 34 has one end wall 36 which is suitably secured to the end wall of the box 28 as shown in FIGS. 1 and 3. Its opposite end is open and directed toward the adjacent end of the flame holder 14 so that air entering the casing 12 from duct 30 will be deflected sharply by the director 34 toward the opposite end of the casing and in a general direction substantially perpendicular to duct 30.

The relative sizes and positions of the focusing director 34 and flame holder 14 are such that a substantial amount of the air from the duct 30 will be made to pass into the flame holder 14, to produce, when mixed with gas therein, a sufficiently rich gas-air mixture to insure first ignition and sufficiently lean enough to insure positive repetitive subsequent ignitions as it leaves the end of the flame holder near the ignitor. The remaining portion of the air will pass from director 34 through the casing 12 along the outside of the flame holder 14. Air flowing through the flame holder, as indicated by arrows 38, will function as primary combustion air, as will be described, while air flowing outside the flame holder 14, as indicated by arrows 40, will function as secondary combustion air.

Primary air within the flame holder 14 will mix with the gas therein, which entered from pipe 16, and this gas-air mixture upon emerging from the flame holder 14 will become initially ignited by ignitor 16, the mixture being "rich" enough to achieve this but "lean" enough to assure subsequent ignitions, as explained. Thereafter, combustion will be sustained by the secondary air, whereupon a flame 42 of substantial length will be produced.

It is to be understood that not only does the focusing director 34 provide means whereby a controlled unvariable quantity of air may be directed into the flame holder 14, but also it helps to produce a successful stoichiometric burner with low carbon monoxide levels. Furthermore, it enables the production of a structure suitable for limited space applications which require abrupt turns for the blower air being fed into the burner. Since such plumbing normally creates high velocity points within the casing, the air stream is properly redirected so as to provide the desired respective amounts of primary and secondary air.

From the foregoing it will be apparent that all of the objectives of this invention have been achieved in the burner structure shown and described. It is to be understood, however, that various modifications and changes may be made by those skilled in the art without departing from the spirit of the invention as expressed in the accompanying claims. Therefore, all matter shown and described is to be interpreted as illustrative and not in a limiting sense.

What is claimed is:

1. A gaseous fuel burner comprising the combination of an elongate tubular casing having an end wall at one end, an ignitor supported within said casing at a point intermediate its ends, an open-ended tubular flame holder disposed within the casing between the ignitor and the end wall, means for injecting gaseous fuel into the flame holder, duct means for directing a stream of air into said casing adjacent said end wall and substantially perpendicular to the axis of the casing, and regulating means spaced from said flame holder and disposed within the casing between said end wall and adjacent end of the flame holder for redirecting said air flow through both the casing and the flame holder and for regulating the quantity of air flowing respectively through and externally of the flame holder, said casing having an opening in a side thereof adjacent said end wall communicating with said duct means, and said regulating means being positioned opposite said opening, said regulating means being of a selected size and shape relative to the flame holder and having cup-shaped surface means dimensioned to receive therewithin from the duct means substantially all of the air entering the casing from the duct means and to redirect a major portion of the air from the duct means through the flame holder as primary combustion air and a minor amount through the casing along the outside of the flame holder as secondary combustion air.

2. A gaseous fuel burner comprising the combination of an elongate tubular casing having an end wall at one end, an ignitor supported within said casing at a point intermediate its ends, an openended tubular flame holder disposed within the casing between the ignitor and the end wall, means for injecting gaseous fuel into the flame holder, duct means for directing a stream of air into said casing adjacent said end wall and substantially perpendicular to the axis of the casing, and regulating means spaced from said flame holder and disposed within the casing between said end wall and adjacent end of the flame holder for redirecting said air flow through both the casing and the flame holder and for regulating the quantity of air flowing respectively through and externally of the flame holder, said regulating means having a cupped air-deflecting surface means facing said duct means for directing a major portion of the incoming air from the duct through said flame holder and a minor portion thereof through the casing along the outside of the flame holder.

* * * * *